July 26, 1932. A. J. ROBERTS 1,869,227
COLLAPSIBLE WING
Filed July 19, 1930 3 Sheets-Sheet 3
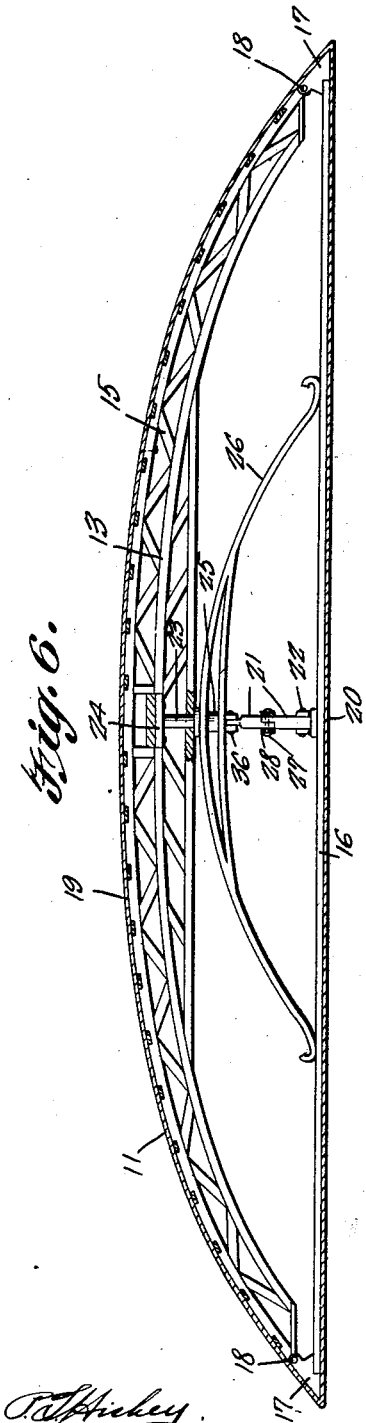
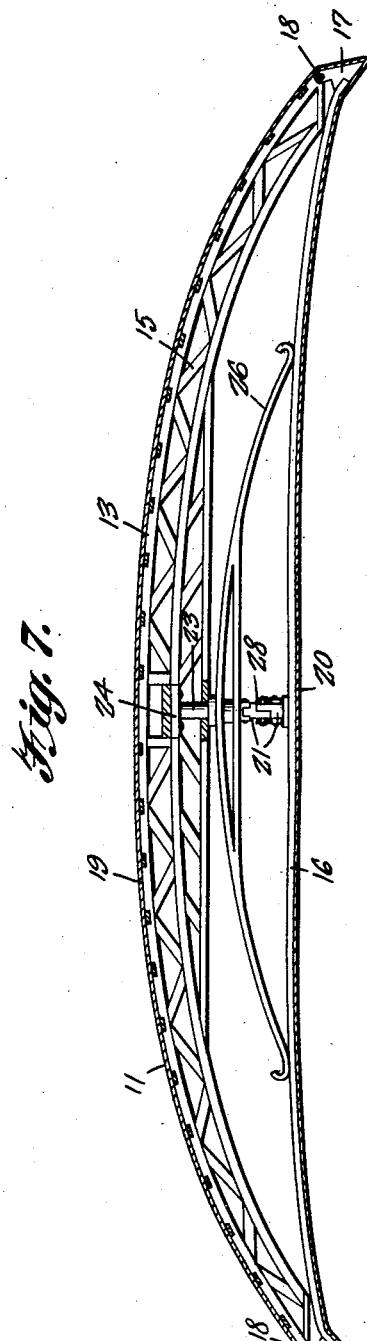

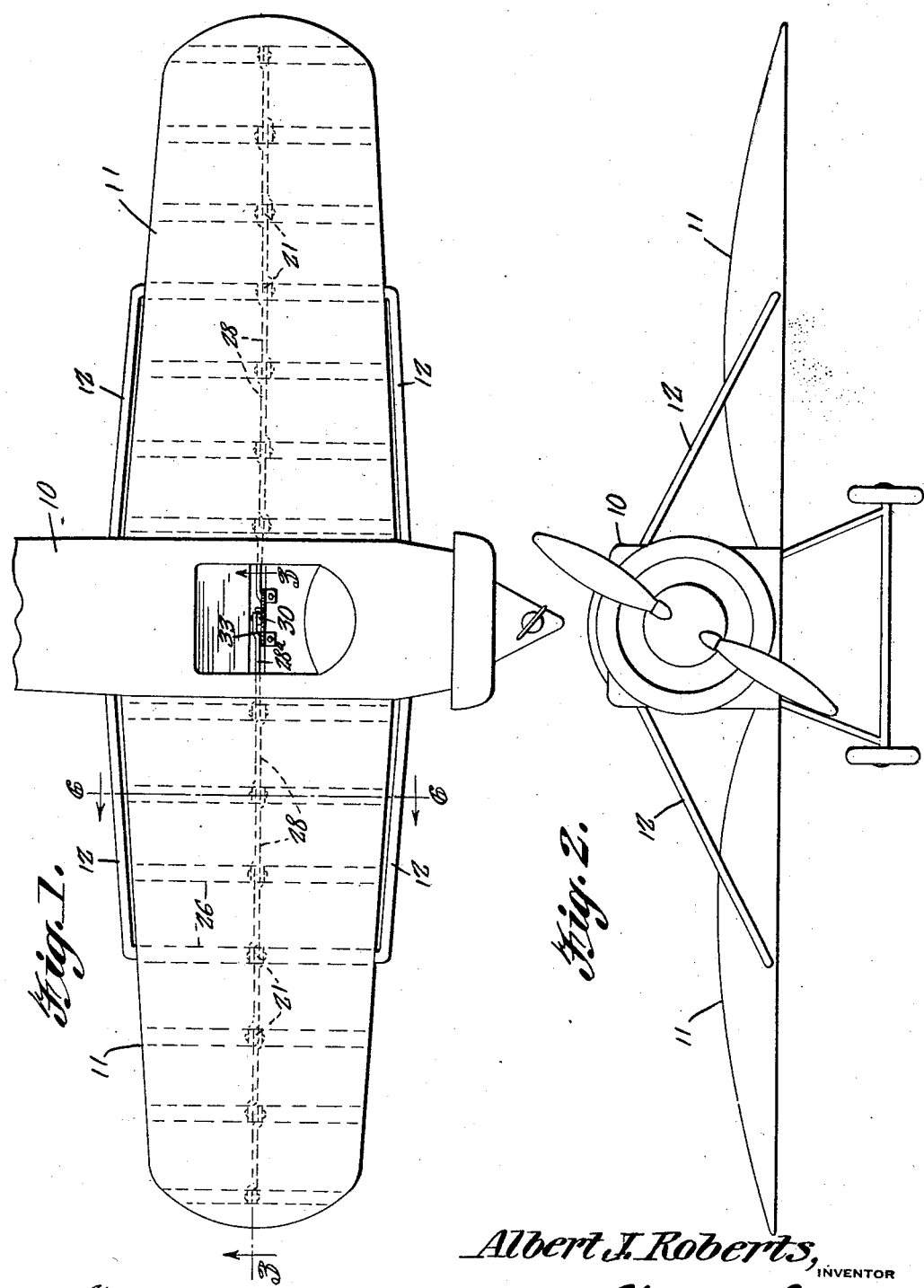

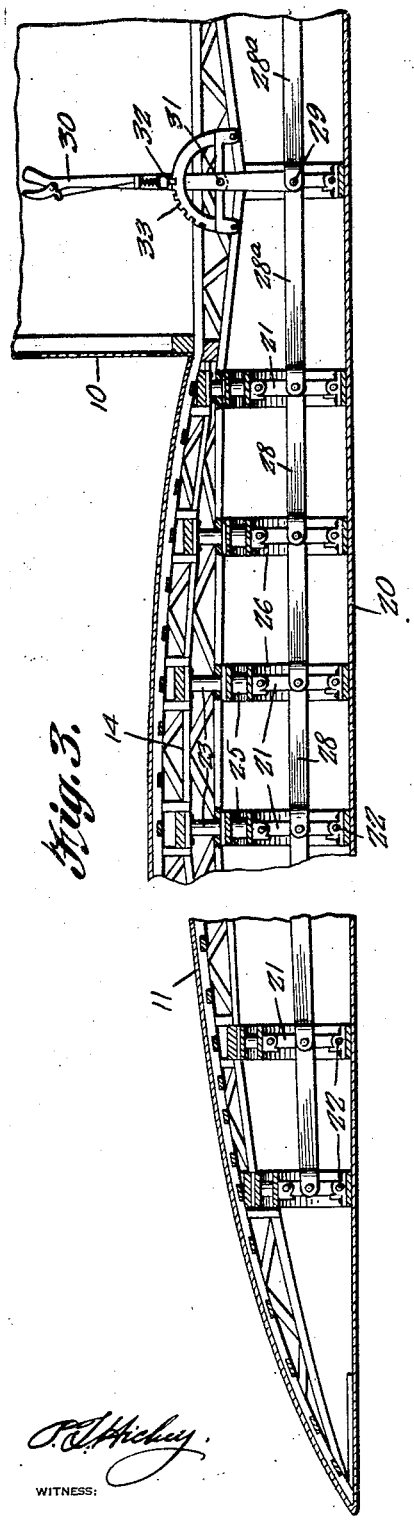

Patented July 26, 1932

1,869,227

UNITED STATES PATENT OFFICE

ALBERT J. ROBERTS, OF CLEVELAND, OHIO, ASSIGNOR OF SEVENTEEN PER CENT TO I. R. WHAN, OF CLEVELAND, OHIO

COLLAPSIBLE WING

Application filed July 19, 1930. Serial No. 469,194.

This invention relates to improvements in flying machines of the heavier than air type, and has for an object the provision of an airfoil or wing having a bottom surface capable of being concaved or flexed inward to provide an air pocket, so that if desired, the wing may be used after the manner of a parachute to check descent of the machine.

Another object of the invention is the provision of an airfoil or wing which includes a normally rigid bottom surface which, if desired, may be flexed inward for the purpose stated, means being provided whereby the wing may be controlled from the fuselage of the machine.

Another object of the invention is the provision of a wing of the above character which is simple in construction, reliable and efficient in use and which may be readily converted from a normally rigid to a flexible wing, and vice versa.

With the above and other objects in view, the invention further includes the following novel features and details of construction, to be hereinafter more fully described, illustrated in the accompanying drawings and pointed out in the appended claims.

In the drawings:—

Figure 1 is a top plan view of an airplane with the invention applied, a portion of the fuselage being broken away.

Figure 2 is a front view of the same.

Figure 3 is an enlarged fragmentary longitudinal sectional view with the wing in normal flying position.

Figure 4 is an enlarged fragmentary longitudinal section showing the wing in its normally extended position.

Figure 5 is a similar view showing the bottom wall of the wing flexed inward.

Figure 6 is a transverse sectional view on the line 6—6 of Figure 1, the bottom wall of the wing being in its normally extended position.

Figure 7 is a similar view showing the bottom wall flexed inward to provide an air pocket.

Referring to the drawings in detail wherein like characters of reference denote corresponding parts, the reference character 10 indicates a portion of the fuselage of an airplane and 11 the main wings. These wings are constructed as hereinafter described and are secured to the fuselage and braced by means of rods or braces 12. The wings 11 each comprise a frame which includes an upper section 13 formed of longitudinally extending ribs 14 of trussed formation and transversely disposed ribs 15 of a similar construction. The bottom section includes spaced resilient or flexible ribs 16 whose opposite ends are connected by a wedge-shaped member 17, one of which extends longitudinally at opposite edges of the wing. These wedge-shaped connecting members 17 are rigid with the resilient ribs 16 and are pivotally connected with the upper section 13 of the frame as shown at 18. Thus, the bottom section of the frame may be moved pivotally with respect to the top section.

The wing is provided with a suitable cover so as to provide a curved top wall 19 and a bottom wall 20. For normal flying, this bottom wall 20 is extended as shown in Figures 3, 4 and 6 of the drawings so as to provide a substantially level bottom wall. The wall 20 is held in this position by means of spaced pairs of links 21. These links are pivotally connected with the ribs 16 as shown at 22 and with posts 23 which are secured to the upper section of the frame as shown at 24. These posts 23 extend through openings 24 provided in spring arms 26, the ends of these arms bearing upon the ribs 16 as shown in Figures 6 and 7 of the drawings. These spring arms 26 serve to yieldingly force the ribs 16 outward so as to provide a smooth rigid bottom wall.

The links 21 are pivotally connected as shown at 27, and connecting the pairs of links are rods 28 whose ends are secured upon the pivots 27. The innermost rod 28a is pivotally connected as shown at 29 to an operating lever 30. This lever is pivotally mounted as shown at 31 and carries a spring influenced dog 32 which engages the teeth of a segment 33. By moving the lever 30 upon its pivot, the links 21 will be moved upon their pivots so as to break joints as shown in Figure 5 of the drawings, so that the ribs 16 will be flexed inward and the bottom wall 20 will be drawn upward as shown in Figure 7 of the drawings so as to provide an air pocket in the under surface of the wing. In the descent of the machine, air will enter and be compressed within this pocket and the latter will function after the manner of a parachute, so as to retard downward movement of the machine.

In order to limit pivotal movement of the links 21 in one direction, the lower links of each pair are pivotally secured within brackets 34 which are provided with stops 35 against which the edges of the links engage. The upper links 21 of each pair are pivotally secured to the inner ends of the rods 23 as shown at 36 and these rods carry stops 37 which function after the manner of the stops 35.

The rods 28a which extend in opposite directions from the center of the fuselage may be controlled by a single operating lever 30 and in this event, the stops 35 and 37 of the wing upon one side of the fuselage are in a reverse position with respect to the stops of the other wing.

The invention is susceptible of various changes in its form, proportions and minor details of construction and the right is herein reserved to make such changes as properly fall within the scope of the appended claims.

Having described the invention what is claimed is:—

1. In an airplane wing, a frame, a top section, a series of spaced flexible ribs, a wedge-shaped member disposed at the opposite longitudinal edges of the wings and rigid with said flexible ribs, means passing through the wedge-shaped members for pivotally connecting the flexible ribs to said top section, a covering extending over the top section and said ribs providing a substantially level bottom wall, posts secured to said upper section, a series of links, certain of said links having pivotal connection with the posts, and the other of said links being pivotally connected with the ribs, means carried by the posts and contacting with the ribs for passing the latter outward to provide a smooth bottom wall, and operating means for said links.

2. In an airplane wing, a frame, a top section, a series of spaced flexible ribs, a wedge-shaped member disposed at the opposite longitudinal edges of the wings and rigid with said flexible ribs, means passing through the wedge-shaped members for pivotally connecting the flexible ribs to said top section, a covering extending over the top section and said ribs providing a substantially level bottom wall, posts secured to said upper section, a series of links, certain of said links having pivotal connection with the posts, and the other of said links being pivotally connected with the ribs, means carried by the posts and contacting with the ribs for bossing the latter outward to provide a smooth bottom wall, operating means for said links, and means for limiting the pivotal movement of said links.

3. In an airplane wing, a frame, a top section, a series of spaced flexible ribs, a wedge-shaped member disposed at the opposite longitudinal edges of the wings and rigid with said flexible ribs, means passing through the wedge-shaped members for pivotally connecting the flexible ribs to said top section, a covering extending over the top section and said ribs providing a substantially level bottom wall, posts secured to said upper section, a series of links, certain of said links having pivotal connection with the posts, and the other of said links being pivotally connected with the ribs, means carried by the posts and contacting with the ribs for bossing the latter outward to provide a smooth bottom wall, operating means for said links, and stops for limiting the pivotal movement of said links.

4. In an airplane wing, a frame, a top section, a series of spaced flexible ribs, a wedge-shaped member disposed at the opposite longitudinal edges of the wings and rigid with said flexible ribs, means passing through the wedge-shaped members for pivotally connecting the flexible ribs to said top section, a covering extending over the top section and said ribs providing a substantially level bottom wall, posts secured to said upper section, a series of links, certain of said links having pivotal connection with the posts, and the other of said links being pivotally connected with the ribs, means carried by the posts and contacting with the ribs for bossing the latter outward to provide a smooth bottom wall, and a spring-pressed operating lever for operating said links.

5. An airplane wing comprising a hollow body having flexing and non-flexing planes, the flexing plane being lowermost and normally straight and adapted to flex toward the other plane throughout the extent of the same.

6. An airplane wing comprising a hollow body having flexing and non-flexing planes, the flexing plane being lowermost and normally straight and adapted to flex toward the other plane throughout the extent of the same, the uppermost non-flexing plane being upwardly arched in two directions.

7. An airplane wing comprising a hollow body having flexing and non-flexing planes, the flexing plane being lowermost and normally straight and adapted to flex toward the other plane throughout the extent of the same, and angularly adjustable fore and aft edges on said wing.

8. In an airplane, wings thereon, each having an upwardly bowed rigid upper plane surface with a curvature longitudinally and transversely and a completely collapsible normally straight lower plane surface.

9. In an airplane, wings thereon, each having an upwardly bowed rigid upper plane surface with a curvature longitudinally and transversely, a completely collapsible normally straight lower plane surface, and angularly adjustable fore and aft edges to the lower plane surface and adapted to dip downwardly on the collapsing of said lower plane surface.

10. In an aircraft wing having superposed planes marginally united, the lowermost plane being normally straight and adapted to flex toward the uppermost plane edge to edge throughout the latter.

11. An airplane wing comprising a body formed with upper and lower plane surfaces, means interiorly of the body and rendering the upper plane surface upwardly arched and rigid, and means for flexing the lower plane surface inwardly toward the upper plane surface and throughout the extent of the latter.

12. An airplane wing comprising a body formed with upper and lower plane surfaces, means interiorly of the body and rendering the upper plane surface upwardly arched and rigid, means for flexing the lower plane surface inwardly toward the upper plane surface and throughout the extent of the latter, and means for downwardly dipping the fore and aft edges of the wing on the flexing of said lower plane surface.

In testimony whereof I affix my signature.

ALBERT J. ROBERTS.